United States Patent
Feathergill et al.

(10) Patent No.: US 9,547,562 B1
(45) Date of Patent: Jan. 17, 2017

(54) BOOT RESTORE SYSTEM FOR RAPIDLY RESTORING VIRTUAL MACHINE BACKUPS

(75) Inventors: David Allen Feathergill, Woodstock, IL (US); Jason Mattox, Spring Grove, IL (US)

(73) Assignee: Dell Software Inc., Aliso Viejo, CA (US)

( * ) Notice: Subject to any disclaimer, the term of this patent is extended or adjusted under 35 U.S.C. 154(b) by 451 days.

(21) Appl. No.: 12/902,930

(22) Filed: Oct. 12, 2010

Related U.S. Application Data

(60) Provisional application No. 61/372,832, filed on Aug. 11, 2010.

(51) Int. Cl.
    *G06F 11/00*     (2006.01)
    *G06F 11/14*     (2006.01)

(52) U.S. Cl.
    CPC ................... *G06F 11/1458* (2013.01)

(58) Field of Classification Search
    CPC .............. G06F 11/1469; G06F 2201/84; G06F 11/1458; G06F 11/1448; G06F 11/203; G06F 11/2033; G06F 11/1484; G06F 11/2069; G06F 2201/815; G06F 11/1471
See application file for complete search history.

(56) References Cited

U.S. PATENT DOCUMENTS

| | | |
|---|---|---|
| 4,130,867 A | 12/1978 | Bachman et al. |
| 4,648,031 A | 3/1987 | Jenner |
| 4,665,520 A | 5/1987 | Strom et al. |
| 5,222,235 A | 6/1993 | Hintz et al. |
| 5,250,687 A | 10/1993 | Lukasavage et al. |
| 5,297,279 A | 3/1994 | Bannon et al. |
| 5,325,505 A | 6/1994 | Hoffecker et al. |
| 5,333,314 A | 7/1994 | Masai et al. |
| 5,422,979 A | 6/1995 | Eichfeld et al. |
| 5,423,037 A | 6/1995 | Hvasshovd |
| 5,455,945 A | 10/1995 | VanderDrift |
| 5,530,855 A | 6/1996 | Satoh et al. |
| 5,551,020 A | 8/1996 | Flax et al. |
| 5,553,303 A | 9/1996 | Hayashi et al. |
| 5,596,747 A | 1/1997 | Katabami et al. |
| 5,634,052 A | 5/1997 | Morris |

(Continued)

OTHER PUBLICATIONS

Microsoft iSCSI Software Target Q and A, published Nov. 30, 2006, http://www.microsoft.com/windowsserversystem/storage/iscsifaq.mspx, in 2 pages.

(Continued)

*Primary Examiner* — Jason Bryan
(74) *Attorney, Agent, or Firm* — Winstead PC

(57) ABSTRACT

A boot restore system and associated processes for rapidly restoring virtual machine images are described. The boot restore system can boot a virtual machine from a set of one or more backup files in a backup repository. The boot restore system can make the backup set available for use by the virtual machine immediately or otherwise rapidly. Thus, users may not have to wait for an actual virtual disk image to be copied to a separate file system before accessing the restored backup set. While a user is accessing the virtual machine, a live migration process can migrate the backup set to a target file system, without any disruption or substantial disruption in use of the running virtual machine.

21 Claims, 7 Drawing Sheets

(56) References Cited

U.S. PATENT DOCUMENTS

| | | |
|---|---|---|
| 5,640,561 A | 6/1997 | Satoh et al. |
| 5,655,081 A | 8/1997 | Bonnell et al. |
| 5,721,915 A | 2/1998 | Sockut et al. |
| 5,758,356 A | 5/1998 | Hara et al. |
| 5,761,667 A | 6/1998 | Koeppen |
| 5,761,677 A | 6/1998 | Senator et al. |
| 5,774,717 A | 6/1998 | Porcaro |
| 5,778,377 A | 7/1998 | Marlin et al. |
| 5,778,392 A | 7/1998 | Stockman et al. |
| 5,796,934 A | 8/1998 | Bhanot et al. |
| 5,799,322 A | 8/1998 | Mosher, Jr. |
| 5,822,780 A | 10/1998 | Schutzman |
| 5,848,416 A | 12/1998 | Tikkanen |
| 5,893,924 A | 4/1999 | Vakkalagadda |
| 5,933,818 A | 8/1999 | Kasravi et al. |
| 5,933,820 A | 8/1999 | Beier et al. |
| 5,940,832 A | 8/1999 | Hamada et al. |
| 5,943,677 A | 8/1999 | Hicks |
| 5,948,108 A | 9/1999 | Lu et al. |
| 5,951,694 A | 9/1999 | Choquier et al. |
| 5,951,695 A | 9/1999 | Kolovson |
| 5,956,489 A | 9/1999 | San Andres et al. |
| 5,956,504 A | 9/1999 | Jagadish et al. |
| 5,978,594 A | 11/1999 | Bonnell et al. |
| 5,983,239 A | 11/1999 | Cannon |
| 5,991,761 A | 11/1999 | Mahoney et al. |
| 5,995,958 A | 11/1999 | Xu |
| 6,003,022 A | 12/1999 | Eberhard et al. |
| 6,016,497 A | 1/2000 | Suver |
| 6,026,412 A | 2/2000 | Sockut et al. |
| 6,029,195 A | 2/2000 | Herz |
| 6,067,545 A | 5/2000 | Wolff |
| 6,070,170 A | 5/2000 | Friske et al. |
| 6,119,128 A | 9/2000 | Courter et al. |
| 6,122,640 A | 9/2000 | Pereira |
| 6,151,607 A | 11/2000 | Lomet |
| 6,157,932 A | 12/2000 | Klein et al. |
| 6,185,699 B1 | 2/2001 | Haderle et al. |
| 6,243,715 B1 | 6/2001 | Bogantz et al. |
| 6,253,212 B1 | 6/2001 | Loaiza et al. |
| 6,289,357 B1 | 9/2001 | Parker |
| 6,343,296 B1 | 1/2002 | Lakhamraju et al. |
| 6,363,387 B1 | 3/2002 | Ponnekanti et al. |
| 6,411,964 B1 | 6/2002 | Iyer et al. |
| 6,460,048 B1 | 10/2002 | Teng et al. |
| 6,470,344 B1 | 10/2002 | Kothuri et al. |
| 6,477,535 B1 | 11/2002 | Mirzadeh |
| 6,499,039 B1 | 12/2002 | Venkatesh et al. |
| 6,519,613 B1 | 2/2003 | Friske et al. |
| 6,523,035 B1 | 2/2003 | Fleming et al. |
| 6,584,474 B1 | 6/2003 | Pereira |
| 6,606,626 B1 | 8/2003 | Ponnekanti |
| 6,631,478 B1 | 10/2003 | Wang et al. |
| 6,671,721 B1 | 12/2003 | Branson et al. |
| 6,691,139 B2 | 2/2004 | Ganesh et al. |
| 6,721,742 B1 | 4/2004 | Uceda-Sosa et al. |
| 6,728,780 B1 | 4/2004 | Hebert |
| 6,834,290 B1 | 12/2004 | Pugh et al. |
| 6,950,834 B2 | 9/2005 | Huras et al. |
| 7,065,538 B2 | 6/2006 | Aronoff et al. |
| 7,096,392 B2 | 8/2006 | Sim-Tang |
| 7,155,558 B1* | 12/2006 | Vaghani et al. .......... 711/4 |
| 7,461,103 B2 | 12/2008 | Aronoff et al. |
| 7,565,661 B2 | 7/2009 | Sim-Tang |
| 7,757,056 B1 | 7/2010 | Fair |
| 7,784,049 B1 | 8/2010 | Gandler |
| 7,805,423 B1 | 9/2010 | Romine et al. |
| 7,877,357 B1 | 1/2011 | Wu et al. |
| 7,904,913 B2 | 3/2011 | Sim-Tang et al. |
| 7,913,043 B2 | 3/2011 | Helliker et al. |
| 7,970,748 B2 | 6/2011 | Romine et al. |
| 7,979,404 B2 | 7/2011 | Sim-Tang |
| 8,046,550 B2 | 10/2011 | Feathergill |
| 8,060,476 B1 | 11/2011 | Afonso et al. |
| 8,117,168 B1 | 2/2012 | Stringham |
| 8,464,254 B1 | 6/2013 | Vohra et al. |
| 8,484,164 B1 | 7/2013 | Sivakumar et al. |
| 2005/0234867 A1 | 10/2005 | Shinkai |
| 2006/0242211 A1 | 10/2006 | Becker et al. |
| 2007/0094312 A1 | 4/2007 | Sim-Tang |
| 2007/0168641 A1 | 7/2007 | Hummel et al. |
| 2008/0022032 A1 | 1/2008 | Nicholas et al. |
| 2008/0104589 A1 | 5/2008 | McCrory et al. |
| 2008/0126722 A1* | 5/2008 | Korlepara ............... 711/162 |
| 2008/0183944 A1 | 7/2008 | Thornton et al. |
| 2008/0244028 A1 | 10/2008 | Le et al. |
| 2009/0187904 A1 | 7/2009 | Serebrin et al. |
| 2009/0216975 A1 | 8/2009 | Halperin et al. |
| 2009/0222496 A1* | 9/2009 | Liu et al. ............... 707/204 |
| 2009/0300425 A1* | 12/2009 | Gollub ............ G06F 11/0715 714/42 |
| 2009/0327576 A1 | 12/2009 | Oshins |
| 2010/0037443 A1 | 2/2010 | Wu et al. |
| 2010/0070725 A1 | 3/2010 | Prahlad et al. |
| 2010/0070978 A1 | 3/2010 | Chawla et al. |
| 2010/0088474 A1 | 4/2010 | Agesen |
| 2010/0100744 A1 | 4/2010 | Dutta |
| 2010/0146004 A1 | 6/2010 | Sim-Tang |
| 2010/0162044 A1 | 6/2010 | Sim-Tang et al. |
| 2010/0186014 A1 | 7/2010 | Vaghani et al. |
| 2010/0198788 A1 | 8/2010 | Sim-Tang |
| 2010/0223610 A1 | 9/2010 | Dehaan et al. |
| 2010/0228903 A1 | 9/2010 | Chandrasekaran et al. |
| 2010/0235831 A1 | 9/2010 | Dittmer |
| 2011/0010515 A1 | 1/2011 | Ranade |
| 2011/0035358 A1 | 2/2011 | Naik |
| 2011/0047340 A1 | 2/2011 | Olson et al. |
| 2011/0061049 A1 | 3/2011 | Kobayashi et al. |
| 2011/0191834 A1 | 8/2011 | Singh et al. |
| 2011/0197052 A1 | 8/2011 | Green et al. |
| 2011/0265083 A1 | 10/2011 | Davis |
| 2012/0017114 A1* | 1/2012 | Timashev et al. ........... 714/15 |
| 2012/0297246 A1* | 11/2012 | Liu et al. ................. 714/15 |

OTHER PUBLICATIONS

VMware Technical Note, Infrastructure 3, SAN Conceptual and Design Basics, Jul. 2007, pp. 1-14.

VMware iSCSI SAN Configuration Guide, ESX Server 3.5, ESX Server 3i version 3.5, VirtualCenter 2.5, Nov. 2007, in 134 pages.

Veeam Software, "Veeam Takes VMWare Backup to a New Level", Aug. 30, 2010, in 2 pages.

Virtualization.info, "Vizioncore to offer VM backups instantaneous boot—Updated," http, posted online Aug. 12, 2010, in 13 pages.

"Quest SharePlex for Oracle," Brochure, Quest Software, Inc., Nov. 1999, 4 pages.

Space Management and Reorganization: Challenges and Solutions, http://quest.com/whitepapers/space_manager_wp.doc, published on or around Dec. 21, 1999.

"Top Five Tips for Space Management and Reorganization," believed to be published after Jul. 21, 1998, in 2 pages.

Computer Associates, "Platinum OnlineReorg Technical Overview, OnlineReorg", http://platinum.com/products/custstor/tsreorg.htm, 5 pages downloaded on Nov. 30, 1999.

Computer Associates, "Platinum Tsreorg Automates Tablespace Reorganizations, Customer Story", http://platinum.com/products/custstor/tsreorg.htm, 2 pages downloaded on Nov. 30, 1999.

Computer Associates, "ProVision Tsreorg for Oracle, Brochure, Database Utilities Tsreorg for Oracle", http://platinum.com/products/custstor/tsreorg.htm, 4 pages downloaded on Nov. 30, 1999.

Computer Associates, "Rapid Reorg for DB2 for OS/390, Brochure", http://platinum.com/products/custstor/tsreorg.htm, 3 pages downloaded on Nov. 30, 1999.

Instavia dBeamer™ Data Sheet, 4 pages, last accessed on Apr. 22, 2011.

J. Pagano, paper on Microsoft Exchange Disaster Recovery Planning, document version 3.00, 1996, in 39 pages.

K. Loney, et al., "Oracle8i, DB Handbook," Oracle Press, 2000, p. 20.

(56) References Cited

OTHER PUBLICATIONS

L. Leverenz, et al., "Oracle8i Concepts," Oracle Corp., vol. 2, Release 8.1.5, 1999, p. 20-3.
Oracle: Introduction to PL/SQL, Power Point Presentation Regarding Triggers, slides 4, 6-7, 11, 14-17, 28, and 51, http://training.ntsource.com/dpec/COURSES/PL1/plc011.htm, 10 pages downloaded on Oct. 20, 2000.
Using dBeamer to Instantly Clone or Move a Hyper-V Machine, http://www.instavia.com/instant-cloning-or-relocating-of-a-hyper-v-machine?tmpl=compon . . . , 1 page, printed Aug. 24, 2011.
Using dBeamer to Instantly Clone or Move a VMWare Machine, http://www.instavia.com/instant-cloning-or-copying-of-a-vmware-virtual-machine?tmpl=co . . . , 2 pages, printed Aug. 24, 2011.
VEEAM Product Overview, Veeam Backup & Replication Virtualization-Powered Data Protection, 2 pages, 2011.
U.S. Appl. No. 13/869,188, Naik.
U.S. Appl. No. 13/101,863, Naik.
U.S. Appl. No. 12/762,162, Mattox.
U.S. Appl. No. 14/672,675, Naik.

\* cited by examiner

BOOT RESTORE SYSTEM FOR RAPIDLY RESTORING VIRTUAL MACHINE BACKUPS

RELATED APPLICATION

This application claims the benefit of priority under 35 U.S.C. §119(e) of U.S. Provisional Patent Application No. 61/372,832, filed on Aug. 11, 2010, and entitled "System for Rapid Restore of Virtual Machine Image Backups," the disclosure of which is hereby incorporated by reference in its entirety.

BACKGROUND

Many companies take advantage of virtualization solutions to consolidate several specialized physical servers and workstations into fewer servers running virtual machines. Each virtual machine can be configured with its own set of virtual hardware (e.g., processor, memory, ports, and the like) such that specialized services that each of the previous physical machines performed can be run in their native operating system. For example, a virtualization layer, or hypervisor, can allocate the computing resources of one or more host servers into one or more virtual machines and can further provide for isolation between such virtual machines. In such a manner, the virtual machine can be a representation of a physical machine by software.

In many virtual machine implementations, each virtual machine is associated with at least one virtual machine disk or image located in one or more files in a data store. The virtual machine image can include files associated with a file system of a guest operating system. The virtual machine image can be copied, moved, backed up, or the like, similar to a general data file.

SUMMARY

Certain embodiments of this disclosure describe a boot restore system and associated processes for rapidly restoring virtual machine images. The boot restore system can boot a virtual machine from a set of one or more backup files in a backup repository. The boot restore system can make the backup set available for use by the virtual machine immediately or otherwise rapidly. Thus, users may not have to wait for an actual virtual disk image to be copied to a separate file system before accessing the restored backup set. While a user is accessing the virtual machine, a live migration process can migrate the backup set to a target file system, without any disruption or substantial disruption in use of the running virtual machine.

For purposes of summarizing the disclosure, certain aspects, advantages and novel features of the inventions have been described herein. It is to be understood that not necessarily all such advantages can be achieved in accordance with any particular embodiment of the inventions disclosed herein. Thus, the inventions disclosed herein can be embodied or carried out in a manner that achieves or optimizes one advantage or group of advantages as taught herein without necessarily achieving other advantages as can be taught or suggested herein.

BRIEF DESCRIPTION OF THE DRAWINGS

Throughout the drawings, reference numbers are re-used to indicate correspondence between referenced elements. The drawings are provided to illustrate embodiments of the inventions described herein and not to limit the scope thereof.

DETAILED DESCRIPTION

I. Introduction

Image-based recovery of an entire virtual machine image can take a significant amount of time because the entire image file is generally copied from the backup repository to target storage over a network. Depending on the size of the image file and network traffic, the recovery process can take many minutes and even hours of time. Image-based recovery can take even longer when restoring a full backup file and associated partial backup files (e.g., incremental or differential) together. Once the full backup file is restored, the changes from each partial backup file are typically restored to the full backup file until the restore is complete, resulting in potentially significant restore time.

This disclosure describes a boot restore system and associated processes for rapidly restoring virtual machine images. In certain embodiments, the boot restore system boots a virtual machine from a set of one or more backup files in a backup repository. The boot restore system can make the backup set available for use by the virtual machine immediately or otherwise rapidly. Thus, in certain embodiments, users do not have to wait for an actual virtual disk image to be copied to a separate file system before accessing the restored backup set. While a user is accessing the virtual machine, a live migration process can migrate the backup set to a target file system over a network, without any disruption or substantial disruption in use of the running virtual machine.

II. Boot Restore System Overview

Figure 1:
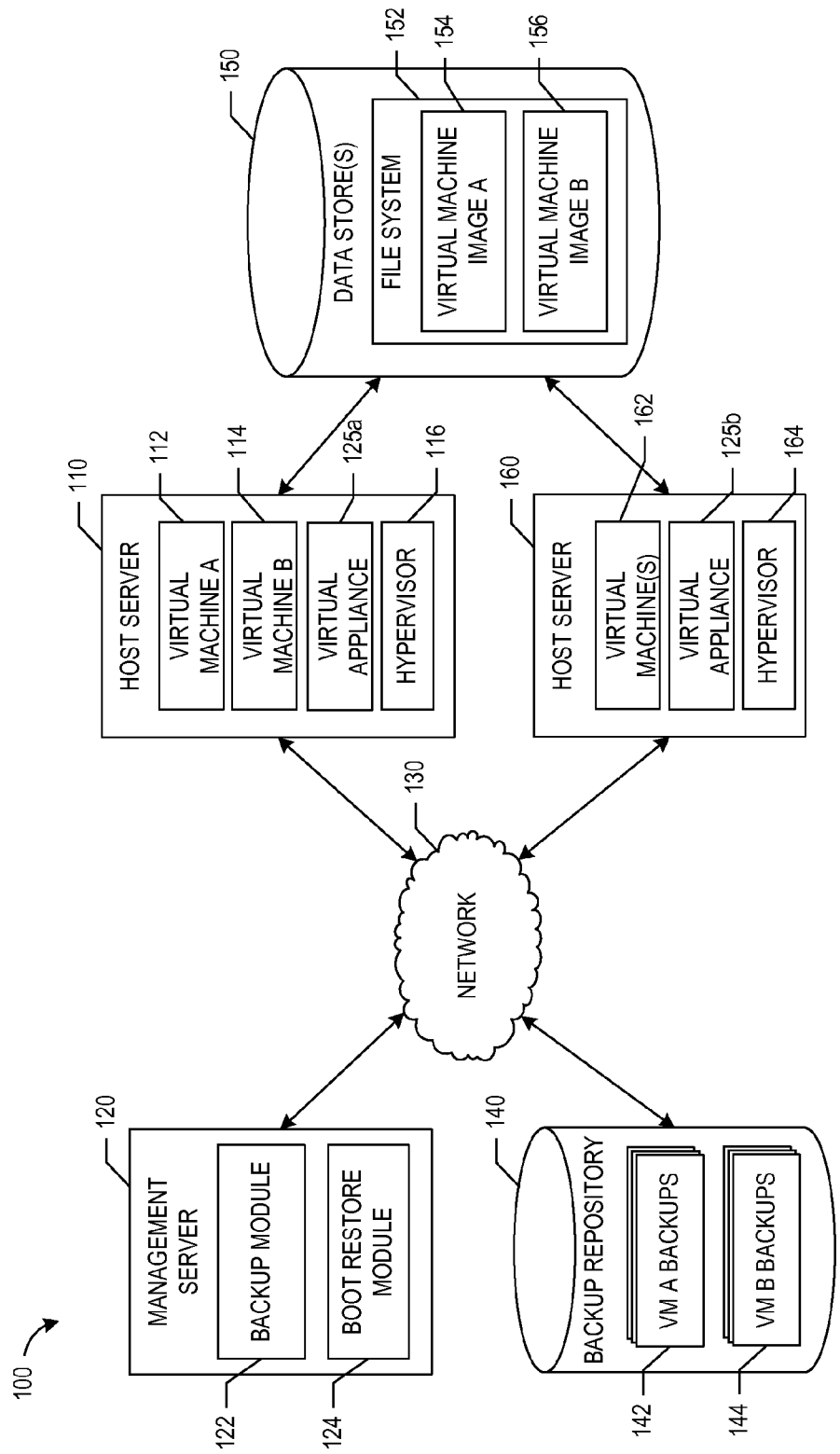
FIG. 1 illustrates an embodiment of a boot restore system for performing backup and boot restore operations in a virtual computing environment.

FIG. 1 depicts an embodiment of a boot restore system 100 for performing backup operations in a virtual computing environment. The boot restore system 100 provides functionality for backing up and restoring virtual machine disk files. In particular, the boot restore system 100 enables archived virtual machine files to be booted from a backup repository. As a result, in certain embodiments, users can have immediate or substantially rapid access to a restored image.

Before describing these boot restore features in greater detail, an overview of virtualization and virtual machine backups will be described so as to give context to the boot restore features. The example boot restore system 100 shown includes a host server 110 that can be implemented with one or more computing devices. The host server 110 can host one or more virtual machines 112, 114 executing on top of a hypervisor 116. In certain embodiments, the hypervisor 116 decouples the physical hardware of the host server 110 from the operating systems of the virtual machine 112, 114. Such abstraction allows, for example, for multiple virtual machines 112, 114 with different operating systems and applications to run in isolation or substantially in isolation on the same physical machine. The hypervisor 116 can also be referred to as a virtual machine monitor (VMM).

The hypervisor 116 includes a virtualization platform that allows for multiple operating systems to run on a host computer at the same time. For instance, the hypervisor 116 can include a thin piece of software that runs directly on top of the hardware platform of the host server 110 and that virtualizes resources of the machine (e.g., a native or "bare-metal" hypervisor). In such embodiments, the virtual machines 112, 114 can run, with their respective operating systems, on the hypervisor 116 without the need for a host operating system. Examples of such bare-metal hypervisors can include, but are not limited to, ESX SERVER by VMware, Inc. (Palo Alto, Calif.), XEN and XENSERVER by Citrix Systems, Inc. (Fort Lauderdale, Fla.), ORACLE VM by Oracle Corporation (Redwood City, Calif.), HYPER-V by Microsoft Corporation (Redmond, Wash.), VIRTUOZZO by Parallels, Inc. (Switzerland), and the like.

In yet other embodiments, the host server 110 can include a hosted architecture in which the hypervisor 116 runs within a host operating system environment. In such embodiments, the hypervisor 116 can rely on the host operating system for device support and/or physical resource management. Examples of such hosted hypervisors can include, but are not limited to, VMWARE WORKSTATION and VMWARE SERVER by VMware, Inc., VIRTUAL SERVER by Microsoft Corporation, PARALLELS WORKSTATION by Parallels, Inc., Kernel-Based Virtual Machine (KVM) (open source), and the like.

For ease of illustration, the remainder of this specification will refer to virtualization primarily in the context of VMWARE systems. However, it should be understood that the boot restore features described herein can be implemented by many other virtualization platforms other than VMWARE. Further, the term virtualization, in addition to having its ordinary meaning, can mean full virtualization or paravirtualization in certain embodiments.

Some or all of the virtual machines 112, 114 can include a guest operating system and associated applications. In such embodiments, the virtual machine 112 accesses the resources (e.g., privileged resources) of the host server 110 through the hypervisor 116. However, in some implementations, the virtual machines 112, 114 can access at least some of the resources of the host server 110 directly. At least some of the virtual machines 112, 114 can also include a backup service (not shown), which can assist with backup operations, as described below.

The host server 110 communicates with one or more data stores 150 to access virtual machine data. For instance, the data store(s) 150 can include a file system 152 that maintains virtual disk files or virtual machine images 152, 154 for some or all of the virtual machines 112, 114 on the host server 110. The virtual machine images 152, 154 can store operating system files, program files, and other data of the virtual machines 112, 114. An example format of a virtual disk used by VMWARE is the virtual machine disk (.vmdk) format.

In certain embodiments, the file system 110 is a VMWARE virtual machine file system (VMFS) provided by VMware, Inc. In such embodiments, the VMFS file system enables multiple host servers (e.g., with installations of ESX server) to have concurrent access to the same virtual machine storage and provides on-disk distributed locking to ensure that the same virtual machine is not powered on by multiple servers at the same time. Other platforms may have different file systems (such as an NTFS file system). In other embodiments, the file system 110 and associated virtual machine images 154, 156 are stored on the host server 110 instead of in a separate data store.

The data store(s) 150 can include any physical or logical storage for holding virtual machine files. For instance, the data store(s) 150 can be implemented as local storage for the host server 110, accessible using a serial advanced technology attachment (SATA) protocol, a small computer system interface (SCSI) protocol, or the like. The data store(s) 150 can also be implemented as part of a storage area network (SAN) or network attached storage (NAS). Accordingly, the data store(s) 150 can be accessed over a network using a protocol such as a fibre channel protocol (FCP), an Internet SCSI (iSCSI) protocol, a network file system (NFS) protocol, a common Internet file system (CIFS) protocol, a file transfer protocol (FTP), a secure FTP (SFTP) protocol, combinations of the same, or the like. The data store(s) 150 can also include one or more redundant arrays of independent disks (RAID) or the like.

The boot restore system 100 further includes a network 130 for communication between the host server 110 and a management server 120. The network 130 can provide wired or wireless communication between the host server 110, the management server 120, a backup repository 140, and/or the data store(s) 150. The network 130 can be a local area network (LAN), a wide area network (WAN), the Internet, an intranet, combinations of the same, or the like.

The management server 120 can be implemented as one or more computing devices. The management server 120 includes a backup module 122 that can coordinate backup operations of the virtual machine disk files 112 through the host server 110. In one embodiment, the backup module 122 causes a backup service (not shown) of the virtual machines 112, 114 to perform certain backup operations.

For example, the backup service can perform shadow copy or snapshot operations, such as are described in U.S. application Ser. No. 12/182,364, filed Jul. 30, 2008, titled "Systems and Methods for Performing Backup Operations of a Virtual Machine," the disclosure of which is hereby incorporated by reference in its entirety. In addition, the boot restore system 100 can include additional features described in U.S. application Ser. No. 12/502,052, filed Jul. 13, 2009, titled "Backup Systems and Methods for a Virtual Computing Environment," the disclosure of which is hereby incorporated by reference in its entirety. Further, the boot restore system 100 can implement the backup and restore features described in U.S. application Ser. No. 12/762,162, filed Apr. 16, 2010, entitled "Block Status Mapping System for Reducing Virtual Machine Backup Storage," the disclosure of which is hereby incorporated by reference in its entirety.

More generally, the backup module 122 can perform full backups or full and partial backups of the virtual machine images 154, 156. Full backups can contain a complete or substantially complete set of data from an image and can be used to restore an image to the state it existed at the time of the backup. Partial backups include into two main variations: differential backups and incremental backups. A differential backup can be a cumulative backup of all or substantially all changes made since the last full backup. An incremental backup can be a backup of all or substantially all changes made since the last backup of any type.

As shown in FIG. 1, a backup repository 140 is also coupled to the network 130 and can directly communicate with the management server 120. The backup module 122 of the management server 120 can store backup sets 142, 144 for each virtual machine 112, 114 in the backup repository 140. The backup sets 142, 144 can each include a full backup file and its associated partial backup file or files. If full backups are used without partial backups, the full backup file can constitute the backup set.

A boot restore module 124 on the management server 120 can perform boot restores of the backup sets 142, 144. Advantageously, in certain embodiments, the boot restore module 124 restores a backup set 142, 144 by booting a virtual machine from the backup repository 140, prior to copying the backup set to the data store(s) 150. Users can therefore access the restored virtual machine substantially immediately or otherwise rapidly, without waiting for the image to be copied over the network 130 to the data store(s) 150. Users can therefore potentially save seconds, minutes, or even hours when restoring virtual machines.

The boot restore module 124 coordinates boot restores in certain embodiments with a virtual appliance 125a running on the host server 110. The boot restore module 124 can inject the virtual appliance 125a on the host server 110 to provide certain restore functionality on the host server 110. The virtual appliance 125a can be a virtual machine that includes one or more modules for interfacing with the backup sets 142 or 144 stored in the backup repository 140. Although not shown, the virtual appliance 125a can include a virtual machine image in the data store 150 or in another data repository (see, e.g., FIG. 5). In one embodiment, the boot restore module 124 includes logic for controlling and/or automating the workflow of a boot restore process, while the virtual appliance 125a manages data accesses to the backup sets 142, 144 in the backup repository 140.

Advantageously, in certain embodiments, running a virtual appliance 125a on a host can promote horizontal scalability of boot restore functionality. To illustrate, a second host server 160 is depicted, which includes a second virtual appliance 125b, one or more virtual machines 162, and a hypervisor 164. As host servers (such as the host server 160) are added to a datacenter, the boot restore module 124 can instantiate additional virtual appliances 125 to run on the new host servers. In doing so, the boot restore module 124 can enable boot restore functionality on those servers. Each virtual appliance 125 can assist with boot restores on one host server, or alternatively, on more than one host server.

In alternative embodiments, some or all of the functionality of the boot restore module 124 and/or the backup module 122 is included in the virtual appliances 125. The management server 120 can be eliminated in such embodiments. In other embodiments, the boot restore module 124 performs the functionality of the virtual appliance 125. Thus, the virtual appliance 125 can be eliminated in such embodiments. Other configurations are possible.

Although the backup system 100 has been described with reference to particular arrangements, other embodiments can comprise more or fewer components. For example, in certain embodiments, the backup system 100 can function without the backup repository 140, and the backup sets 142, 144 can be stored in the data store(s) 150. In yet other embodiments, the host servers 110, 160 can include a plurality of servers in a clustered arrangement such that the computing and memory resources of the clustered servers are shared by one or more virtual machines 112, 114. Moreover, in certain embodiments, the backup module 122 or restore module 124 maintained by the management server 120 can instead reside on the host server(s) 110, 160 and/or the backup repository 140.

III. Example Boot Restore Features

Figure 2:
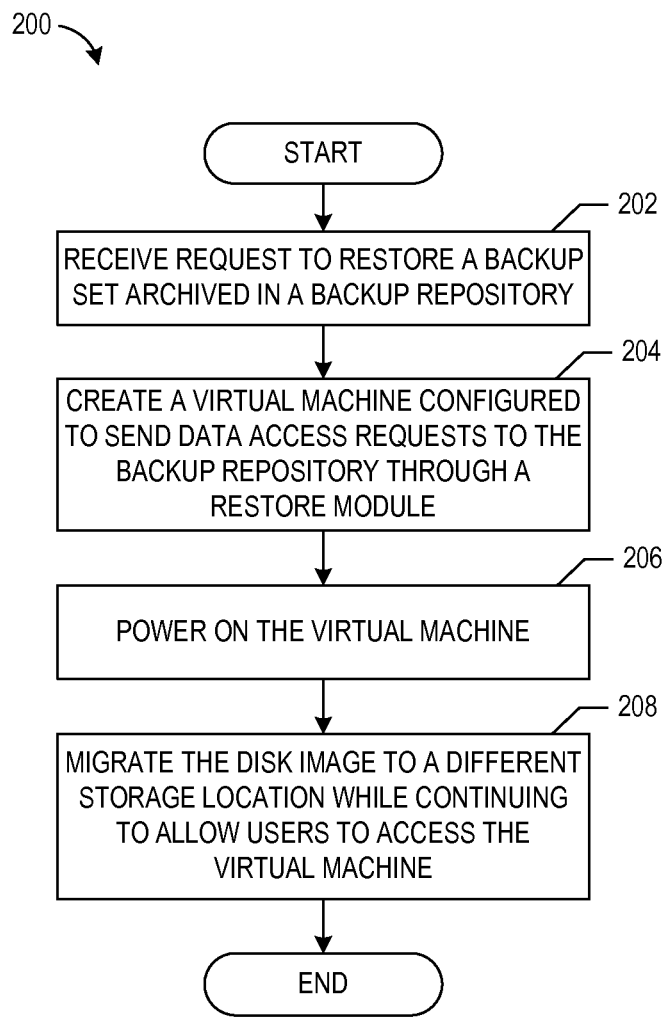
FIG. 2 illustrates an overview embodiment of a boot restore process.

FIG. 2 illustrates an overview embodiment of a boot restore process 200 for rapidly restoring a virtual machine image. The boot restore process 200 can be implemented by the boot restore system 100 described above or by the systems described below. For example, the boot restore process 200 can be implemented by the boot restore module 124 and/or the virtual appliance 125.

At block 202, a request is received to restore a backup set archived in a backup repository. The request can be made by a user in one embodiment. The restore module 124 described above can output a user interface that enables a user to initiate a boot restore. A user can select a full backup file or a full and one or more partial backup files to restore. Alternatively, the user can specify a recurring restore window in which to restore a backup set or portion thereof periodically. Thus, the request to restore a backup set or portion thereof can be provided by a user or by an automated scheduling component or the like.

A virtual machine is created at block 204. Creation of the virtual machine can include configuring the virtual machine to send data access (I/O) requests, such as reads and writes, to the backup repository 140. However, the backup set being restored from the backup repository 140 may not be in a typical virtual machine image format capable of readily servicing read and write requests. For instance, the backup set may be compressed and/or may contain multiple files (e.g., full plus partial(s)) that have not been formatted into a virtual machine image.

Advantageously, in certain embodiments, the virtual machine is configured to send data access requests to the backup repository 140 through the virtual appliance 125. The virtual appliance 125 can transform the data access requests to the proper format for accessing the backup set. The virtual appliance 125 can therefore abstract the backup set to the virtual machine, making the backup set appear as a virtual disk image. Thus, in certain embodiments, the virtual appliance 125 (and/or the boot restore module 124) exposes a pseudo disk image to the virtual machine.

In other embodiments, the virtual machine is configured to send data access requests directly to the backup repository 140. A software layer (not shown) can be installed on the backup repository 140 to intercept and handle these requests. This software layer can take the place of, or be used in conjunction with, the restore module 124.

The virtual machine is powered on at block 206. The pseudo disk image is migrated to a different storage location at block 208. Users can advantageously use the restored virtual machine 114 during the migration process. The migration process can be a live migration process, which, in addition to having its ordinary meaning, can mean a migration of a virtual machine while the virtual machine is running. Examples of live migration processes that can be used include the vMotion and Storage vMotion applications provided by VMWARE.

Figure 3:
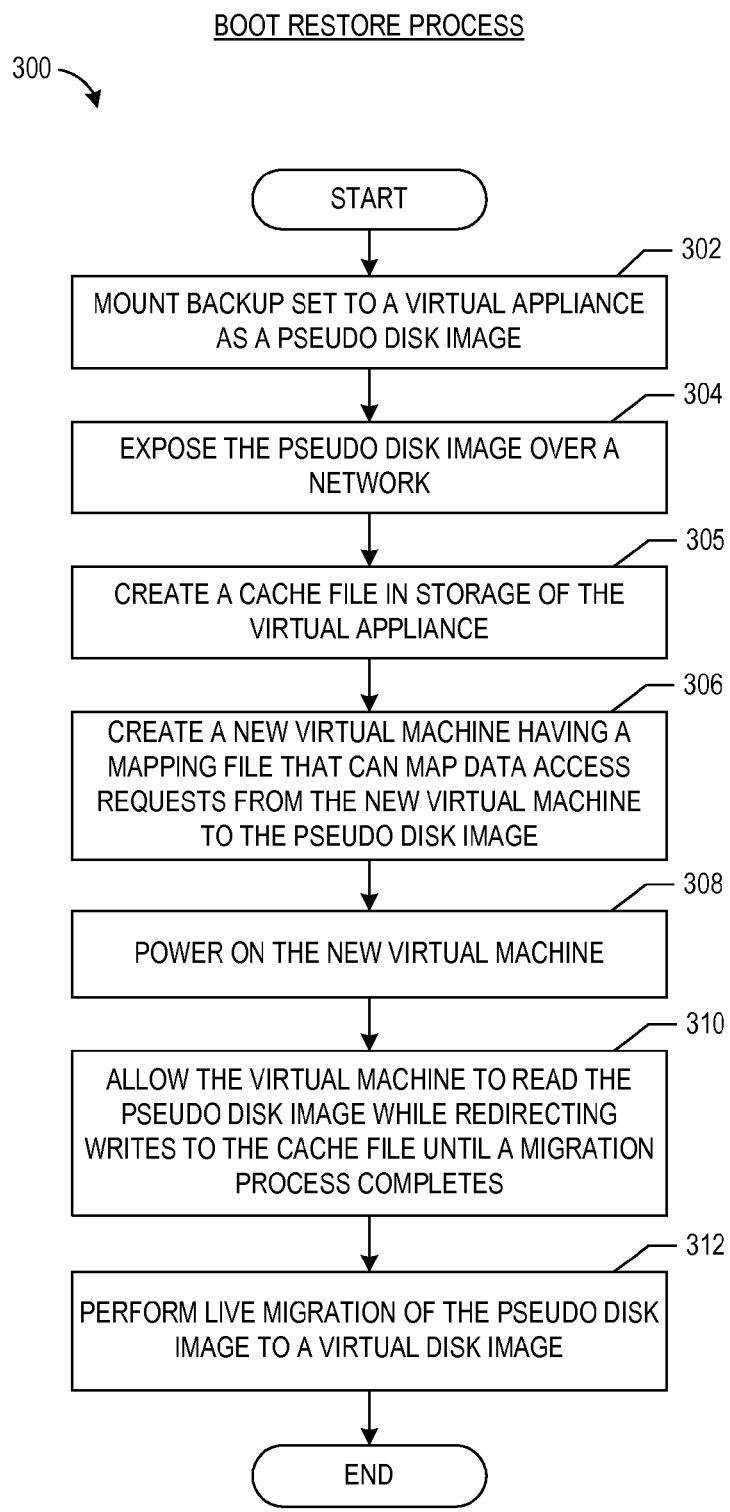
FIG. 3 illustrates a more detailed embodiment of the boot restore process.

FIG. 3 illustrates a more detailed embodiment of a boot restore process 300. The boot restore process 300 can be implemented by the boot restore system 100 described above with respect to FIG. 1 or by the systems described below. For instance, the boot restore module 124 can perform some or all of the process 300, with assistance from the virtual appliance 125. For ease of illustration, the boot restore process 300 will be described primarily in the context of a more detailed boot restore system 500 depicted in FIGS. 5 and 6.

At block 302 of FIG. 3, a backup set is mounted to a virtual appliance as a pseudo disk image. Mounting the backup set can be implemented by the boot restore module 124 attaching the backup set as a block-level device to the virtual appliance 125. Performing this mount can enable the virtual appliance 125 to access the backup set as if it were an actual disk image. Using a pseudo disk image for backup sets containing multiple files can effectively result in merging, interleaving, or streaming together changes from backup files.

Figure 5:
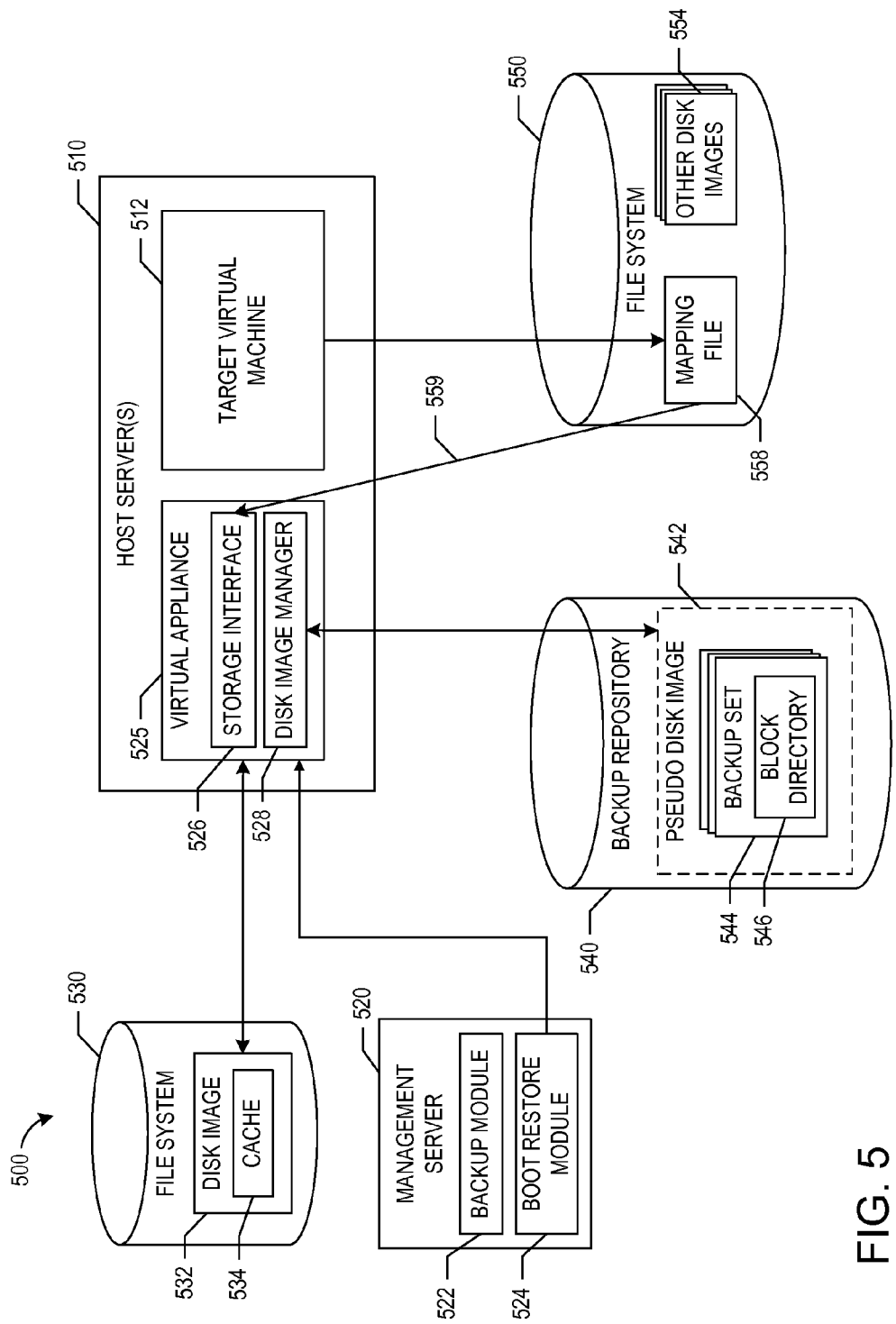
FIGS. 5 and 6 illustrate more detailed embodiments of a boot restore system.
Figure 6:
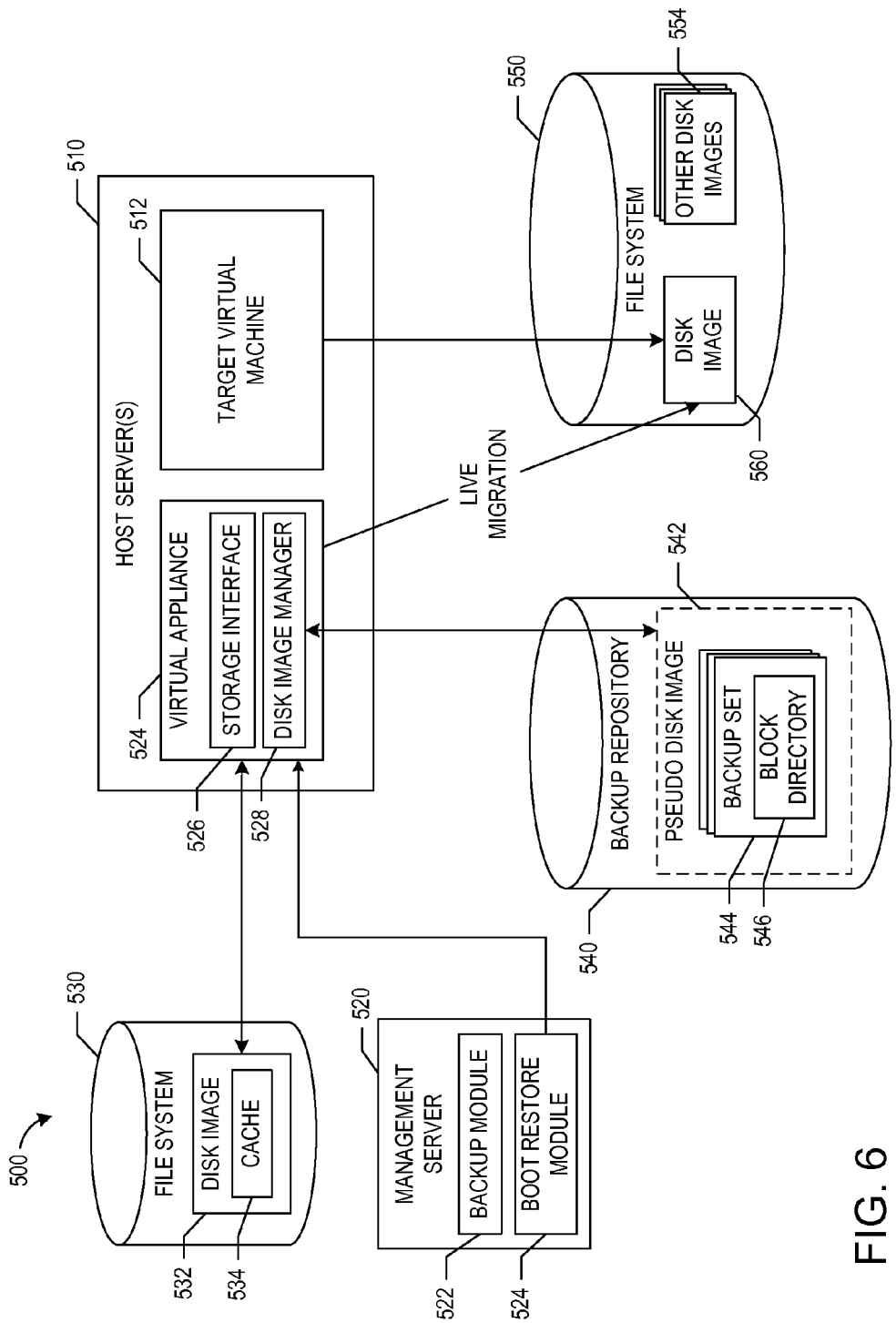

Functionality for performing this mount can be explained in the context of the more detailed boot restore system 500 of FIG. 5. In the boot restore system 500, a management server 520 having a backup module 522 and boot restore module 524 is shown. These components can have all the functionality described above. A virtual appliance 525 is also shown executing on a host server (or servers) 510. The virtual appliance 525 can be implemented as a virtual machine in communication with a disk image 532 stored in a file system 530. In one embodiment, the file system 530 is created by the boot restore module 524 when initially deploying the virtual appliance 525. Providing the file system 530, which can be separate from a customer's production file system (e.g., the file system 550), can ease setup of the virtual appliance 525.

The virtual appliance 525 can include all the functionality of the virtual appliance 125 described above. In the depicted embodiment, the virtual appliance 525 also includes a storage interface 526 and a disk image manager 528. The storage interface 526 can provide an interface for a target, newly restored virtual machine 512 to communicate with a backup set 544 in a backup repository 540. The disk image manager 528 can include a driver or the like that transforms the backup set 544 into a pseudo disk image 542. The interface provided by the storage interface 526 can allow the target virtual machine 512 to access the pseudo disk image 542 over a network or locally.

The disk image manager 528 can transform the backup set 544 into the pseudo disk image 542 using one or more block directories 546 stored with the backup set 544. The block directory 546 or directories can be generated by the backup module 522 for some or all backups performed. A block directory 546 can be metadata that contains the disk locations of blocks in a backup file or backup set (e.g., the backup set 544). The block directory 546 can be a data structure, such as a table, map, bitmap, byte map, array, matrix, or the like.

A block directory 546 for a single backup file, for example, might contain information regarding the locations in a disk of the backup repository 540 for each block of the backup file. For a full backup file, the block directory 546 can contain disk location information for all or substantially all blocks in an archived disk image. For a partial backup file, the block directory 546 can contain disk location information for the blocks changed in the partial backup file.

In one embodiment, the disk image manager 528 consolidates block directories for multiple files into a single block directory 546 for the backup set 544. Alternatively, the backup module 122 can update a single block directory 546 each time a new partial backup is performed. If the backup set 544 is compressed into an archive file, the block directory 546 can be stored as part of the metadata in the archive file. The unified or single block directory 546 can indicate, for each block in an image, the location on disk of the current block. The block directory 546 can therefore include the locations of the most recent data in the backup set 544, potentially reducing disk seeks to find the most recent data from individual backup files. A process for creating such a unified block directory is described below with respect to FIG. 4A.

Referring again to FIG. 3, at block 304, the pseudo disk image 542 is exposed or shared over a network, such as the network 130 of FIG. 1. This block 304 can include assigning the pseudo disk image 542 a network address, which can further include a storage identifier. One example storage protocol that can be used to address the pseudo disk image is the Internet small computer system interface (iSCSI) protocol. Thus, for example, the boot restore module 524 of FIG. 5 can transform the pseudo disk image into an iSCSI target or iSCSI LUN (logical unit number) having an iSCSI target identifier. Once shared over iSCSI (or another protocol), the pseudo disk image 542 can be zoned by the boot restore module 524 as a raw disk to the host server(s) 510. As a raw disk, the pseudo disk image 542 can be accessible at the block level.

The iSCSI protocol is a block-level protocol, enabling addressing of the pseudo disk image 542 at the block level. Other protocols, including file-level protocols (e.g., NFS), may be used to address the pseudo disk image 542. However, in certain embodiments, providing block-level access to the pseudo disk image 542 can provide better throughput than may be available with file-level protocols. This improved throughput can be achieved because, in certain embodiments, file-level overhead is avoided with iSCSI and other block-level protocols. Further, NFS and other file-level protocols are often implemented in MICROSOFT WINDOWS environments, whereas iSCSI is often implemented in LINUX environments. Architectural features of the iSCSI protocol and LINUX operating system can provide better scalability in enterprise deployments of the boot restore system 100, 500 than is available with the NFS protocol and MICROSOFT WINDOWS systems.

Referring again to FIG. 3, a cache file is created in storage of the virtual appliance at block 305. An example of such a cache file 534 is shown in FIG. 5. The cache file can include scratch space on the virtual appliance's 524 disk image 532 and can be used for caching writes to the pseudo disk image 542. In other embodiments, the cache file is created in storage that is external to the virtual appliance's 524 disk image 532, such as in a repository accessible by the virtual appliance 524 over a network. The cache file can be created by the virtual appliance 524 or by the boot restore module 524. Caching is described in greater detail below with respect to block 310 and FIG. 4B.

At block 306 of FIG. 3, a new virtual machine is created with a mapping file that can map data access requests from the new virtual machine to the pseudo disk image. Referring again to FIG. 5, the target virtual machine 512 represents an example new virtual machine that can be created at block 306. In particular, the boot restore module 524 can create this target virtual machine 512. In one embodiment, the virtual machine creator 526 creates the target virtual machine 512 with an application programming interface (API) call to a VMWARE API (not shown) or the like. The boot restore module 524 creates the target virtual machine 512 on the same host as the virtual appliance 525, in certain embodiments, to improve restore performance. However, the virtual appliance 525 and the target virtual machine 512 can run on separate hosts 510 in other implementations.

When creating the target virtual machine 512, the boot restore module 524 can create one or more configuration files, including a mapping file 588, a log file, and a .vmdk descriptor file, among possibly others. In VMWARE systems, the mapping file 558 can be a raw device mapping (RDM). The RDM file can be a physical RDM or a virtual RDM (vRDM) that supports VMWARE snapshot functionality. More generally, the mapping file 558 can map data access (e.g., I/O) requests to a raw device, for example, the pseudo disk image 542.

The mapping file 558 can provide metadata regarding the pseudo disk image 532, such as layout information of the pseudo disk image 542, including disk size, a number of sectors, a number of cylinders, and the like. The mapping file 558 can also include a network address and/or storage address of the pseudo disk image 542. In one embodiment, this network address includes an IP address of the virtual appliance (e.g., the virtual appliance 525), together with the iSCSI target identifier and/or LUN of the pseudo disk image 542. The mapping file 558 can therefore redirect data access requests from the target virtual machine 512 to the pseudo disk image 542.

For example, once the target virtual machine 512 is powered on, data access requests from the target virtual machine 512 to the mapping file 558 can be redirected to the storage interface 526 (arrow 559). The storage interface 526 can implement storage server software, such as iSCSI server software or the like, that services iSCSI or other storage requests. The storage interface 526 can communicate with the target virtual machine 510 via the mapping file 558 using a communications protocol or protocols, such as the TCP/IP protocol stack. The storage interface 526 can extract storage commands (e.g., SCSI commands) from packets received from the target virtual machine 512. The storage interface 526 can pass the extracted storage commands to the disk image manager 528, which can perform reads, writes, or other storage commands. Likewise, the storage interface 526 can encapsulate any data received from the disk image manager 528 into TCP/IP packets or other communications messages and send these packets or messages to the target virtual machine 512.

Advantageously, the mapping file 558 can be located in the file system 550, which can be a production data store of a customer or the like. Other disk images 554 for other virtual machines of the customer can also be on the file system 550. In other embodiments, the mapping file 558 can be placed on the file system 530, which can be an out-of-the-box file system 530 provided by a vendor of the virtual appliance 525.

The new virtual machine (512) is powered on or otherwise started at block 308 of FIG. 3. Powering on the new virtual machine can include loading some or all of the virtual machine into memory of a host server (510) and executing instructions of the virtual machine's operating system. The virtual machine can be powered on by the virtual machine creator 528 of FIG. 5.

With continued reference to FIG. 3, once the virtual machine is powered on at block 308, the virtual machine is allowed to access the pseudo disk image at block 310. Reads to the pseudo disk image are passed through to the backup set (544), in certain embodiments, whereas writes to the pseudo disk image are redirected to the cache file (534) created above. This redirection and caching are performed in certain embodiments until a migration process completes (block 312). Referring to FIG. 5, the disk image manager 528 can manage read and write accesses to the pseudo disk image 542. Management of data access requests is described in greater detail below with respect to FIG. 4B.

Referring again to FIG. 3, a live migration of the pseudo disk image to a virtual disk image is performed at block 312. Advantageously, in certain embodiments, this live migration can be performed without interrupting or substantially interrupting usage of the restored virtual machine. As part of this live migration process, the mapping file 558 can optionally be converted to an actual virtual machine image 560 (see FIG. 6). For example, in VMWARE systems, the mapping file 558 can be converted from an RDM or vRDM file to a VMDK (virtual machine disk) file. Live migration can be performed by the boot restore module 524 making an API call to a vMotion or Storage vMotion process in VMWARE systems.

During the live migration process, data from the backup set and the cache can be interleaved together to form an actual virtual disk image. This interleaving can be abstracted from the live migration process by the disk image manager 528. For instance, the disk image manager 528 can supply the most recent changed blocks from the cache 534 or backup set 544 (as identified by the block directory) when requested by the live migration process (e.g., via the storage interface 526). The disk image manager 528 can supply unchanged blocks from a full backup file in the backup set 544. Of course, if the backup set 544 includes only a full backup file, the disk image manager 528 can provide changed blocks from the cache and unchanged blocks from the full backup file. By interleaving the changed and unchanged blocks in this manner, the disk image manager 528 can enable the live migration process to seamlessly integrate the changed and unchanged blocks into an actual virtual disk image.

The process 300 and associated systems can provide several advantages. One possible advantage is that users can use the restored virtual machine on boot of the virtual machine, which can provide much faster access to the restored virtual machine than in currently-available systems. Another possible advantage is that the user is able to use the virtual machine both before and during the live migration process. Moreover, when the virtual appliance and target virtual machine are on the same host, fewer computing (e.g., processor) resources may be needed to perform the live migration.

In alternative embodiments, at least some of the features of the process 300 or system 500 may be altered or omitted. For instance, in one implementation, live migration is not performed. Live migration may be omitted to permit quick maintenance on a virtual machine or for testing purposes, among other reasons. Further, the mapping file need not be changed to a virtual disk image in some cases, depending on user preference. Many other configurations are possible.

Figure 4A:
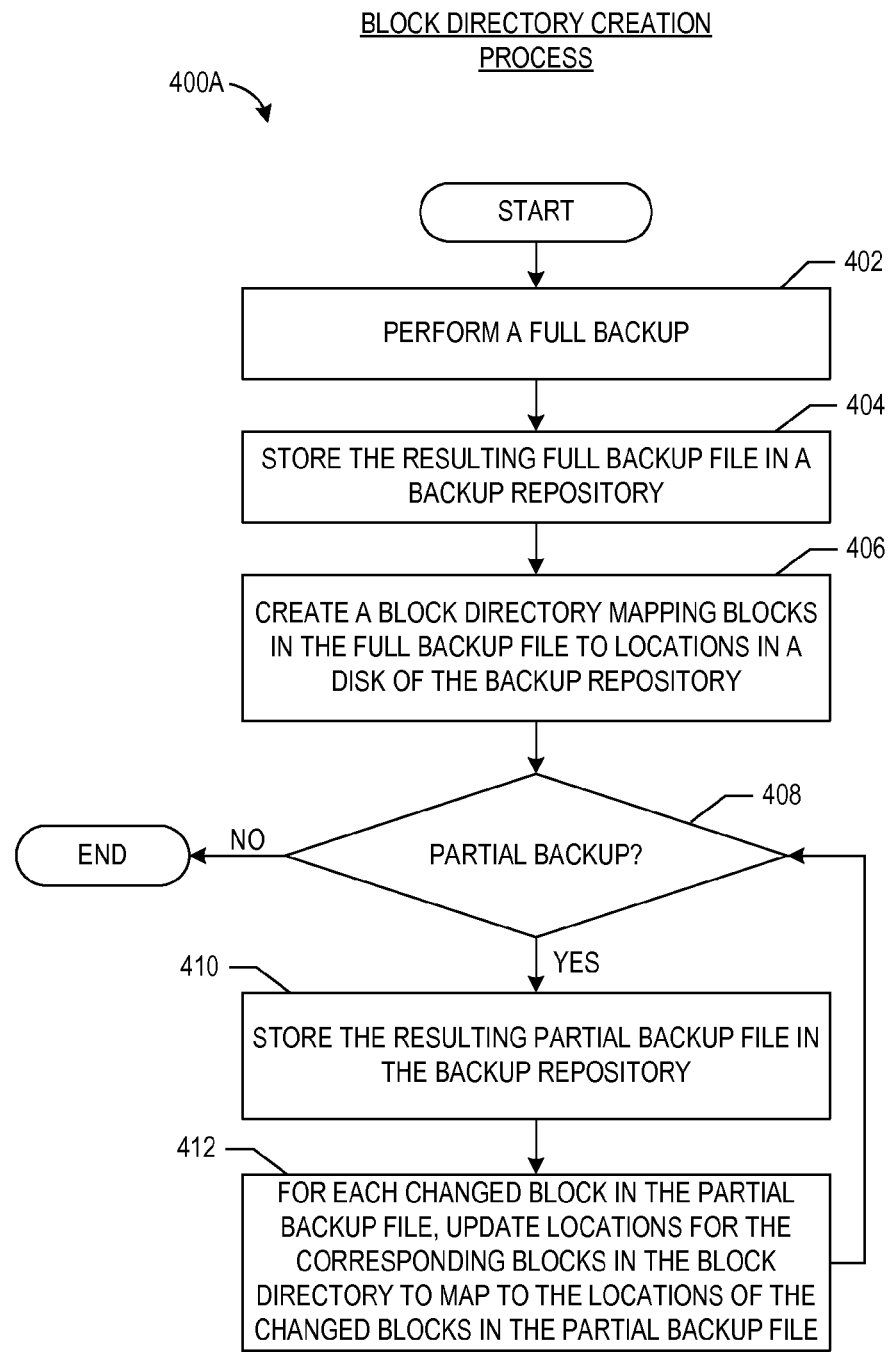
FIG. 4A illustrates an embodiment of a process for creating a block directory.

FIG. 4A illustrates an embodiment of a process 400A for creating a block directory for a backup set archive. The process 400A can be performed by any of the systems described herein, including the boot restore systems 100, 500. In one embodiment, the process 400A is implemented by the backup module 122 or 522. Advantageously, in certain embodiments, the process 400A creates a unified block directory for a plurality of backup files in a backup set archive. As such, the block directory can be used for efficient access to the backup set archive as a pseudo disk image.

At block 402, a full backup is performed. The full backup can be performed using any of the backup tools described above with respect to FIG. 1. At block 404, the resulting backup file from the full backup is stored in a backup repository. Storing the full backup file can optionally involve compressing the full backup file into an archive file, using any suitable compression algorithm or algorithms. The archive file can include, among other data, blocks and associated block headers. The block header for each block can include information such as a hash of the data in the associated block, a file identifier associated with the block (which can distinguish the backup file containing a most recent copy of the block), and an offset within the file from which the data block was read during backup and to which it may be written during restore.

A block directory is created at block 406 for the full backup file. The block directory can map blocks in the full backup file to locations in a disk of the backup repository where the blocks are stored. The block directory can include the block headers for some or all of the blocks in the full backup file. Because the block header for each block can identify the backup file to which the block belongs, the most current blocks may be referenced by the block directory. Thus far, a full backup file has been used to create the block directory, and therefore the block headers refer to the full backup file.

At decision block 408, it is determined whether a partial backup has been performed. If so, at block 410, the resulting partial backup file is stored in the backup repository. At block 412, each block that was changed in the partial backup file is updated in the block directory. For example, new block headers can be inserted in the block directory, which correspond to the new or changed blocks in the partial backup file. Block headers may also be removed from the block directory if blocks are deleted. New block headers can identify the backup file where the actual blocks are found and can overwrite previous block headers corresponding to older data. Thus, in certain embodiments, the block directory can include some or all the metadata useful to seek an arbitrary point in a backup set archive in a single place, thereby reducing disk seeks when accessing the backup set archive as a pseudo disk image.

The process 400A loops back to decision block 408. If additional partial backups (such as incremental backups) are performed, the process 400A can loop through blocks 408 through 412 for each additional partial backup. Otherwise, if no further backups are to be performed, the process 400A ends. Although described primarily in the context of blocks, the directory 546 can more generally reflect changes in disk locations of any portion of a backup set, such as a partition, file, cluster, sector, chunk of blocks, or the like.

The process 400A can be implemented so as to store the block directory in memory, rather than in an archive or any backup files. In this manner, an archive or backup file can be kept in an unchanged condition so as to minimize potential corruption of archived data. Thus, the process 400BA can be performed as a post-process, after the backups in a backup set (full and any partial backups) have been performed. For instance, the unified block directory for a backup set can be created by analyzing the block directory for each backup file according to the process 400A, starting with the full backup and proceeding to the first partial backup, followed by any subsequent partial backups. In other embodiments, the block directory can be stored in the archive or in an individual backup file, or in another place in disk storage. The block directory can also be stored in disk storage and in volatile memory.

Figure 4B:
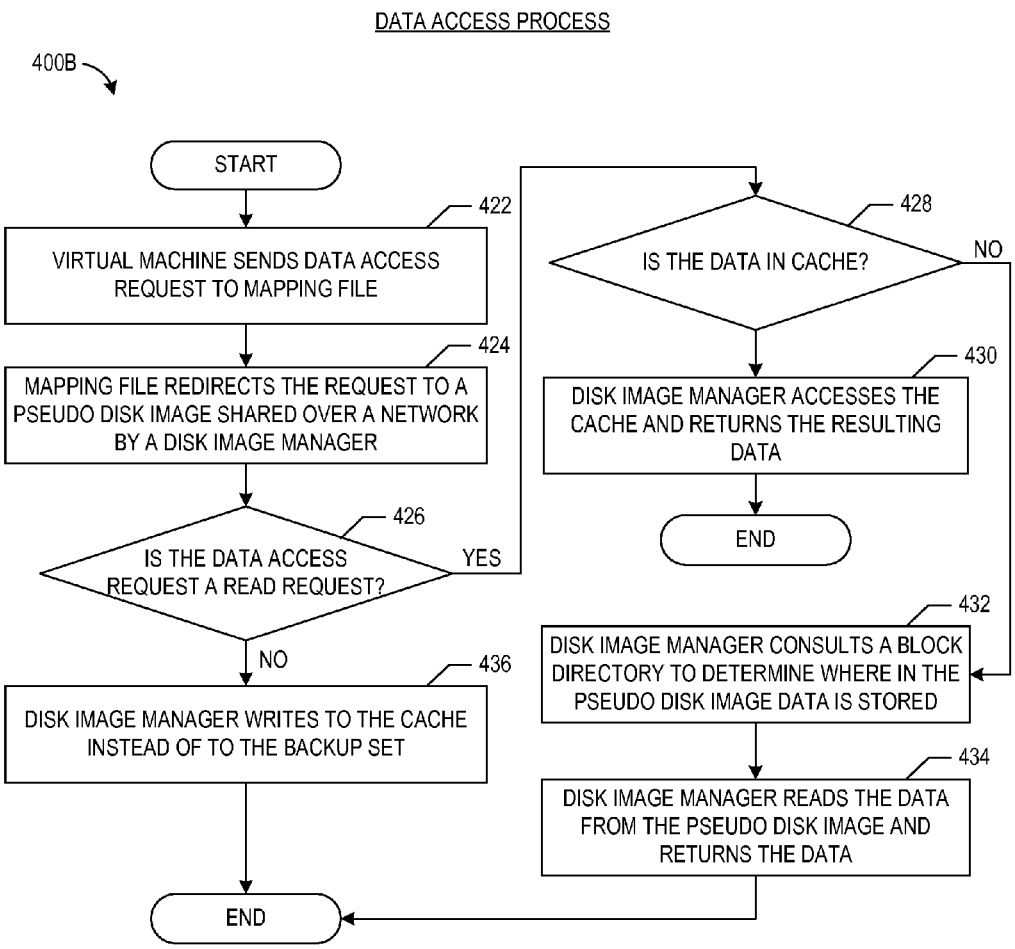
FIG. 4B illustrates an embodiment of a data access process that can be performed during the boot restore process.

FIG. 4B illustrates a more detailed embodiment of a data access process 400B for accessing data from a disk image during boot restore. The data access process 400B can be implemented by the boot restore system 100 or 500. For example, the data access process 400B can be implemented by the virtual appliance 125 or 525. The data access process 400B is a more detailed embodiment of block 310 of the process 300, illustrating an example scenario for handling reads and writes to a pseudo disk image.

At block 402, a virtual machine sends a data access request to a mapping file. This virtual machine can be the restored or target virtual machine discussed above, and the mapping file can be the mapping file 558 referred to above. In response to receiving the request, at block 404, the mapping file redirects the request to a pseudo disk image shared over a network by the disk image manager 528.

It is determined at decision block 406, for example, by the disk image manager 528, whether the data access request is a read request. If so, it is further determined by the disk image manager 528 at decision block 408 whether the data sought to be read is in the cache file 534. If so, the disk image manager 528 accesses the cache file 534 and returns the resulting data to the virtual machine at block 410.

If not, the disk image manager 528 consults a block directory at block 412 to determine where in the pseudo disk image the requested data is stored. For example, the disk image manager 528 can access the block headers in the block directory to determine which backup file in a backup set includes the data to be read. This data can be in a partial backup file or a full backup file, for instance. The disk image manager 528 reads the data from the pseudo disk image, from the appropriate backup file, and returns the resulting data at block 414.

If the data access request is a write request instead of a read request, the disk image manager 528 writes to the cache file 534 instead of to the backup set. By redirecting writes to the cache file 534, the disk image manager 528 can leave the backup set unchanged. The disk image manager 528 can use a copy-on-write mechanism to write to the cache file 534. In alternative embodiments, the disk image manager 528 writes directly to the backup set instead of writing to a cache file 534. The disk image manager 528 can write to the cache even during a live migration process (see FIG. 3).

Further, in other embodiments, the disk image manager 528 can service data access requests without the use of a block directory. Instead, the disk image manager 528 can directly access each backup file, from latest to earliest, to determine which file contains the most recent sought-after data. Many other variations are possible.

In some embodiments, data obtained from the pseudo disk image from read requests can also be cached in the cache file 534. Subsequent requests for this data can therefore first access the cache file to determine whether the requested data has been cached. If the requested data has not been cached, the read request can be passed to the pseudo disk image.

IV. Terminology

Depending on the embodiment, certain acts, events, or functions of any of the algorithms described herein can be performed in a different sequence, can be added, merged, or left out all together (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A system for restoring a virtual machine image, the system comprising:
   a management server comprising computer hardware, the management server programmed to implement:
   a backup module configured to perform one or more backups of a virtual machine image, the one or more backups comprising a backup set; and
   a restore module implemented in a virtual appliance running on a hypervisor, the restore module comprising a disk image manager and a virtual machine creator, the disk image manager configured to:
      receive a request to restore a backup set of the virtual machine image,
      mount one or more backup files in the backup set as a pseudo disk image accessible to the restore module; and
      share the pseudo disk image as a block-level device, the pseudo disk image configured to be accessible via raw disk commands;
      create a cache in storage of the virtual appliance;
      responsive to write requests directed to the pseudo disk image, redirecting the write requests to the cache;
      responsive to read requests directed to the pseudo disk image, accessing at least one of the cache and the one or more backup files;
   the virtual machine creator configured to:
      create a virtual machine, said creating the virtual machine comprising creating a mapping file configured to map raw disk access requests from the virtual machine to the pseudo disk image,
      start the virtual machine on a host server, such that the virtual machine is configured to send raw disk access requests to the pseudo disk image via the mapping file; and
      wherein the virtual appliance comprises at least one virtual machine, the at least one virtual machine including one or more modules that interface with the backup set.

2. The system of claim 1, wherein the backup module is further configured to create a block directory corresponding to changed blocks in the backup set, the backup set comprising a full backup file and a partial backup file.

3. The system of claim 2, wherein the disk image manager is further configured to:
   service the raw disk access requests by accessing the block directory to determine whether any changes to the full backup file were stored in the partial backup file, and
   in response to determining that changes occurred, service the raw disk access requests on the partial backup file.

4. The system of claim 2, wherein the partial backup file comprises one of the following: an incremental backup file and a differential backup file.

5. The system of claim 1, wherein the mapping file comprises a network address of the pseudo disk image.

6. The system of claim 5, wherein the disk image manager is further configured to share the pseudo disk image as a block-level device over a storage area network by at least transforming the pseudo disk image into an Internet Small Computer System Interface (iSCSI) target.

7. The system of claim 6, wherein the network address further comprises an iSCSI target identifier configured to identify the pseudo disk image.

8. A method comprising, by a computer system comprising computer hardware:
by a disk image manager of a restore module implemented in a virtual appliance running on a hypervisor:
receiving a request to restore a backup set of a virtual machine image;
mounting one or more backup files of the backup set as a pseudo disk image;
sharing the pseudo disk image as a block-level device, the pseudo disk image configured to be accessible via raw disk commands;
creating a cache in storage of the virtual appliance;
responsive to write requests directed to the pseudo disk image, redirecting the write requests to the cache; and
responsive to read requests directed to the pseudo disk image, accessing at least one of the cache and the one or more backup files;
by a virtual machine creator of the restore module:
creating a virtual machine, said creating the virtual machine comprising creating a mapping file configured to map raw disk access requests from the virtual machine to the pseudo disk image; and
starting the virtual machine on a host server, such that the virtual machine is configured to send raw disk access requests to the pseudo disk image via the mapping file; and
wherein the virtual appliance comprises at least one virtual machine, the at least one virtual machine interfacing with the backup set.

9. The method of claim 8, the method comprising creating a block directory corresponding to changed blocks in the backup set, the backup set comprising a full backup file and a partial backup file.

10. The method of claim 9, the method comprising:
servicing the raw disk access requests by accessing the block directory to determine whether any changes to the full backup file were stored in the partial backup file, and
in response to determining that changes occurred, servicing the raw disk access requests on the partial backup file.

11. The method of claim 9, wherein the partial backup file comprises one of the following: an incremental backup file and a differential backup file.

12. The method of claim 8, wherein the mapping file comprises a network address of the pseudo disk image.

13. The method of claim 12, the method comprising sharing the pseudo disk image as a block-level device over a storage area network by at least transforming the pseudo disk image into an Internet Small Computer System Interface (iSCSI) target.

14. The method of claim 13, wherein the network address further comprises an iSCSI target identifier configured to identify the pseudo disk image.

15. A non-transitory computer-readable storage medium comprising computer-executable instructions configured to implement a method, the method comprising:
by a disk image manager of a restore module implemented in a virtual appliance running on a hypervisor:
receiving a request to restore a backup set of a virtual machine image;
mounting one or more backup files of the backup set as a pseudo disk image;
sharing the pseudo disk image as a block-level device, the pseudo disk image configured to be accessible via raw disk commands;
creating a cache in storage of the virtual appliance;
responsive to write requests directed to the pseudo disk image, redirecting the write requests to the cache; and
responsive to read requests directed to the pseudo disk image, accessing at least one of the cache and the one or more backup files;
by a virtual machine creator of the restore module:
creating a virtual machine, said creating the virtual machine comprising creating a mapping file configured to map raw disk access requests from the virtual machine to the pseudo disk image;
starting the virtual machine on a host server, such that the virtual machine is configured to send raw disk access requests to the pseudo disk image via the mapping file; and
wherein the virtual appliance comprises at least one virtual machine, the at least one virtual machine interfacing with the backup set.

16. The non-transitory computer-readable storage medium of claim 15, the method comprising creating a block directory corresponding to changed blocks in the backup set, the backup set comprising a full backup file and a partial backup file.

17. The non-transitory computer-readable storage medium of claim 16, the method comprising:
servicing the raw disk access requests by accessing the block directory to determine whether any changes to the full backup file were stored in the partial backup file, and
in response to determining that changes occurred, servicing the raw disk access requests on the partial backup file.

18. The non-transitory computer-readable storage medium of claim 16, wherein the partial backup file comprises one of the following: an incremental backup file and a differential backup file.

19. The non-transitory computer-readable storage medium of claim 15, wherein the mapping file comprises a network address of the pseudo disk image.

20. The non-transitory computer-readable storage medium of claim 19, the method comprising sharing the pseudo disk image as a block-level device over a storage area network by at least transforming the pseudo disk image into an Internet Small Computer System Interface (iSCSI) target.

21. The non-transitory computer-readable storage medium of claim 20, wherein the network address further comprises an iSCSI target identifier configured to identify the pseudo disk image.

* * * * *